United States Patent [19]
Martin

[11] 3,757,457
[45] Sept. 11, 1973

[54] HUMANE ANIMAL TRAP
[76] Inventor: Andrew M. Martin, Rt. 4, Box 71, Milford, Del. 19963
[22] Filed: July 13, 1972
[21] Appl. No.: 271,386

[52] U.S. Cl. .................................. 43/81, 43/82
[51] Int. Cl. ........................................ A01k 23/00
[58] Field of Search ................................ 43/81, 82

[56] References Cited
UNITED STATES PATENTS
| | | | |
|---|---|---|---|
| 1,802,272 | 4/1931 | Rice | 43/81 |
| 2,321,219 | 6/1943 | Lewis | 43/81 |
| 2,378,253 | 6/1945 | Stilson | 43/81 |
| 2,616,211 | 11/1952 | Johnson | 43/81 |

Primary Examiner—Louis G. Mancene
Assistant Examiner—Robert F. Cutting
Attorney—Thomas B. Van Poole et al.

[57] ABSTRACT

An improved humane animal trap having an obtusely angular frame of which one leg thereof more particularly forms a base which stabilizes the trap in its use condition. One of its two jaws is of large arcuate form with opposite end portions connecting it in a fixed manner to opposite end portions of said frame to form a generally circular animal entry opening therewith. The movable inverted U-shaped jaw is pivotally connected at its free leg ends to said frame and is spring biased toward its closed condition with the bight portion of the U-shaped jaw being arcuately movable outwardly adjacent the arcuate portion of the fixed jaw, and movable in a plane transvere to the direction of entry into the trap. The trap embodies a self-centering triggering and latch mechanism which includes an angular shaped trigger pivotally mounted on the frame and fixed jaw members and oriented at one side of the entry opening. The trigger has an upper portion slideably engageable in overlaying relation to a jaw-cocking latch member. The trigger is also provided with a trigger finger projecting into the entry opening to be moved by the animal upon entering the trap. The self-centering triggering and latch arrangement is more humane, being such that the animal while engaging the trigger must move a substantial distance into the trap, with attendant substantial relative sliding movement occurring between the trigger and latch before the latch is freed to release the spring-biased movable jaw, which then moves in the direction of the ground supported base frame portion, thereby precluding a tendency to overturn the trap which otherwise would tend to occur by a reverse direction travel of the jaw.

16 Claims, 7 Drawing Figures

PATENTED SEP 11 1973

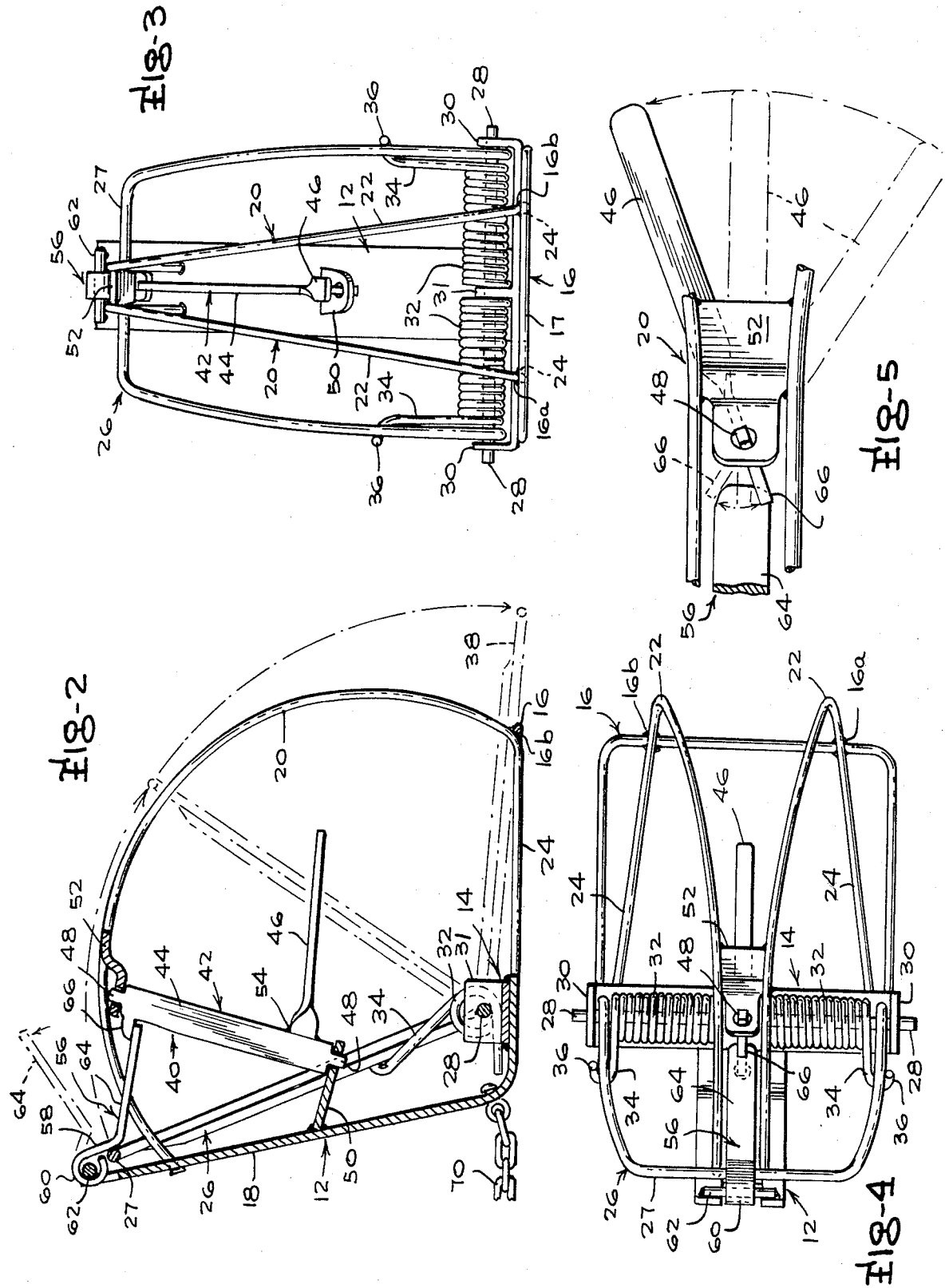

HUMANE ANIMAL TRAP

BACKGROUND OF THE INVENTION

This invention relates generally to animal traps and more particularly to improved humane animal traps which will operate to spring close when the animal is substantially within the confines of the trap.

There have been many animal traps known in the prior art for catching a variety of animals. In the past the animal traps of the humane type which are designed to break the neck or back of the animal, as distinguished from merely grasping and holding one of the extremities of the animal, have been deficient in that there is a strong possibility that the animal would trigger the trap to a closed condition at a time when only a portion of its body is within the trap. This has resulted in the trap closing prematurely on one of the foremost extremities of the animal, or more likely, just sliding over and off of the top of the head, thereby permitting the animal to work free. Examples of the type of trap in which the animal may prematurely trigger same before being fully within the trap can be found among the following patents. U.S. Pat. Nos. Hooker 390,021, Bloker 680,114, Thompson 901,851, Hoffman 1,064,647, Cooper 1,726,694, and Nerby 1,881,871.

In each of the foregoing patents, the trigger can be operated by either the animal stepping upon the trigger or the animal moving the trigger with merely the forepart of its body, such as the head against the trigger, thereby setting the trap off without being fully within the closing area of the jaws.

Consequently, it was the primary object of my earlier invention to provide a more humane animal trap which was designed to close when the animal was substantially fully within the trap, said invention having been granted Letters Patent No. 3,161,984 dated Dec. 22, 1964. While the trap of my said U.S. Pat. No. 3,161,984 has met with considerable success, its movable jaw moved in a direction away from the base support with a resultant force tending to overturn the trap device. I have since devised a considerable number of improvements including a trap having a movable jaw which is moved toward the direction of the base and underlying ground support to help stabilize same and thereby precluding a tendency to overturn the trap. Further improvements were made in conjunction with the improved latching and triggering mechanism including devising means to make it more stable and yet more sensitive to its angular orientation.

Accordingly, it is a primary object of my present invention to provide an improved humane animal trap which is designed to close when the animal is a substantial distance into the trap.

Another principal object of the invention is to provide an improved trap of the foregoing character and embodying a fixed jaw and a movable jaw together with more stable, yet more sensitive, triggering and latching mechanisms which are of a self-centering character, contributing to the easier setting of the trap.

Another object of the present invention is to provide a trap having an improved triggering and latching mechanism which provides for cocking of the spring biased jaw by only a relatively light pressure to hold a relatively much stronger spring action, and requiring only light triggering pressure responsive to the animal advancing through the entry loop of the trap.

Still an additional object is to provide an improved trap of the aforementioned character in which the trigger moves transversely across the plane of movement of the movable jaw to adjustably trigger the mechanism to a closed condition in accordance with and depending upon the extent that the animal has entered into the trap.

These and other objects and advantages of my improved present invention will become more readily apparent upon careful consideration of the following detailed description, taken in conjunction with the accompanying illustrative drawings.

BRIEF DESCRIPTION OF THE DRAWINGS

FIG. 2 is a cross-sectional elevational view taken substantially on line 2—2 of FIG. 1;

FIG. 3 is an end elevational view of the trap of FIGS. 1 and 2 as viewed from the right-hand side thereof;

FIG. 4 is a top plan view of the trap shown in FIGS. 1–3;

FIG. 5 is an enlarged fragmentary top plan view of the latching and trigger mechanism, with the solid line illustrated trigger shown in its laterally offset position just prior to triggering the cocked jaw; and the dotted line position showing a reverse direction, fully offset, jaw releasing position thereof;

DETAILED DESCRIPTION OF A PREFERRED EMBODIMENT

Figure 1:
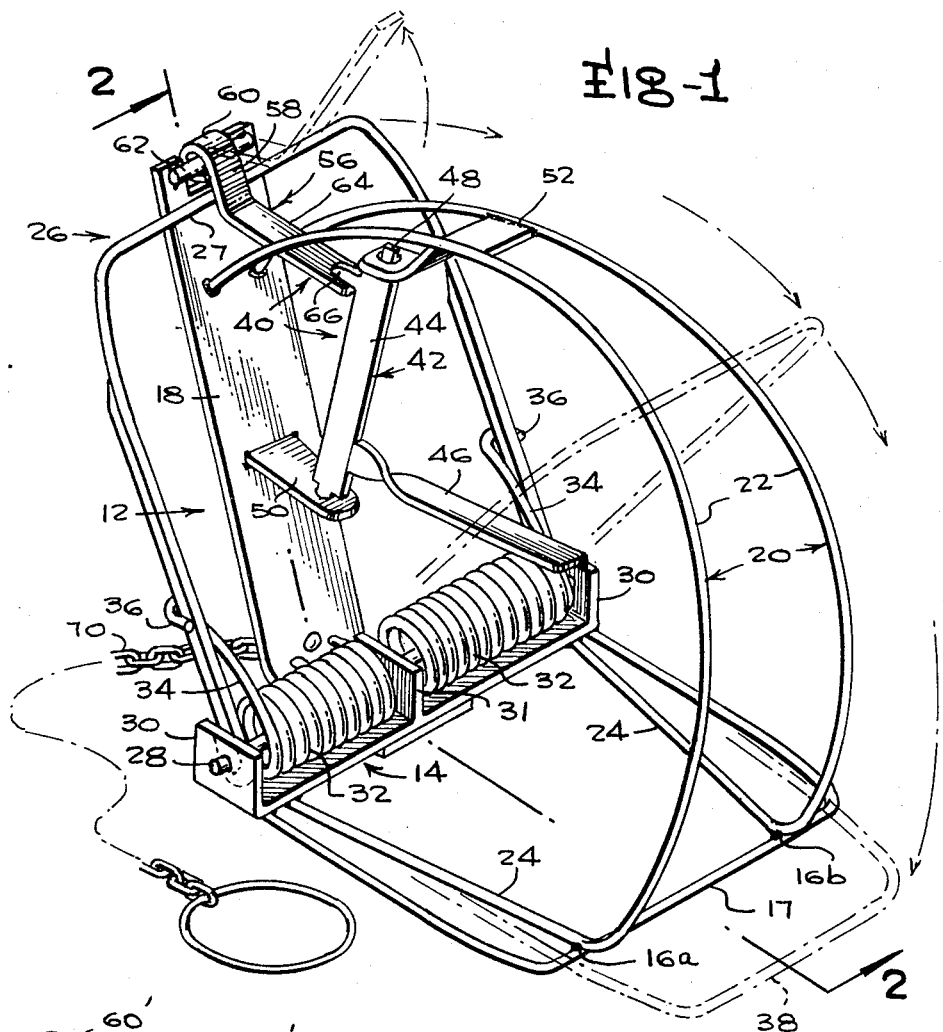
FIG. 1 is a perspective view of my improved trap shown in a cocked condition and showing in dash-dot outline the movement of the movable jaw during travel to a closed condition.

In general the present invention incorporates in an animal trap, spring urged jaws which include therebetween a trigger assembly having a pivoted animal contact trigger portion which must be moved by the animal for a substantial predetermined distance upon entering the trap before the trap will be triggered. My improved trap components provide an arrangement which include a more stable yet more sensitive latch and triggering mechanism which is characterized as being of the self-centering type. The animal contact means of the trigger is particularly designed to accomplish the objects and advantages of this invention due to its pivotal mounting and angular orientation for movement transversely to the plane of movement of the movable jaw. The improved latching mechanism embodies an angular latch member pivotally mounted at its shorter leg with the leg being generally tangent to the pivotal barrel or sleeve thereof and thereby eccentric to the pivot axis thereof, and with the longer leg of the latch terminating in a free end engageable with latch retaining means formed on an upper part of an angular shaped trigger member. The latch is mounted so as to move freely out of the way of the spring-biased jaw during triggered movement of the jaw, which jaw is powered by heavy-duty springs associated therewith. The latch and trigger mechanisms are designed so that the angled shorter leg which holds the bight portion of the movable jaw is in close proximity relative to the pivot axis of the latch member, which enables the cocking of the spring by only a relatively light pressure to hold a relatively much stronger spring action, thereby resulting in a need for only a light triggering pressure action by the animal when advancing through the trap.

Referring in more detail to the drawing figures, wherein like reference characters will designate like parts throughout the several figures of the drawings, the trap is generally designated at 10 and includes an angular frame 12 having a fore and aft elongated base bracket 14 with a rigidly attached loop-type base leg 16. Another leg 18 projects angularly upward from the base bracket 14 at generally right angles thereto and preferably at an obtuse angle thereto. The upright leg 18 is shown of strap-like form although it may also be constructed of heavy-duty wire shaped in a loop configuration. Likewise while the base leg 16 is shown in a preferred loop configuration, it may also be of solid-plate material. Rigidly connected to this angular frame is a fixed jaw means 20 preferably comprised of a spaced-apart pair of arcuate heavy-duty wire jaw members 22 of generally semi-circular loop form rigidly attached as by welding at opposite ends of the angular frame. To further strengthen the base loop 16, arcuate jaw members 22 may be continued beyond their preferably brazed or welded connections 16a and 16b to form truss like braces 24, the terminal ends of which are also welded or otherwise suitably affixed to the base bracket 14. The braces 24 diverge from their connection points with the bight portion 17 of the base loop 16. The arcuate wire jaw members 22 are seen to converge from their points of attachment with base loop 16 as they arc upwardly toward their connection with the upright leg 18 of the frame 12. Said arcuate jaw members 22 in the area adjacent the connection with upright leg 18 are disposed substantially parallel with one another, when viewed from above, as shown better in FIGS. 4 and 5. The trap further comprises at least one movable jaw 26 which is preferably formed of a heavy metal wire or the like and shaped in an elongated loop of inverted U-shape form when in its cocked position. It is understood that the fixed jaw means 20, while shown comprised of wire type jaws 22, it may also be formed of a strap-like material whose upper end adjacent its connection with the upright leg 18 would be bifurcated to correspond with the parallel spaced portions of the jaw members 22. The bifurcated or equivalent construction restricts lateral movement of the latch member, to be described, to preclude premature triggering of the trap which may otherwise occur attendant load pressure of the movable jaw 26 against the latch responsive to the initial trigger movement attendant an animal entering the trap.

The movable jaw 26 is suitably pivoted at its opposite ends on an axis wire or shaft 28 which passes through upturned end portions 30 and an intermediate middle bracket 31 connected to said bracket 14. Spring means preferably in the form of the pair of coil springs 32 are disposed around the axis shaft 28 between each end bracket portion and the intermediate bracket portion 31. Innermost adjacent end portions of the springs 32 have the terminal end thereof anchored to the bracket 14, as by passing beneath the axis shaft 28 and preferably being welded to said bracket 14. The outermost convolutions of said springs terminate in linearly extended arms 34 which terminate in hooks 36 for engagement about opposite sides of the movable jaw 26. It is understood that the springs are disposed in a manner so as to induce strong pivotal biasing movement of the jaw from the solid line cocked position of FIG. 1 to the completely closed dotted line position 38 in FIGS. 1 and 2.

The trigger and latch mechanism is designated generally at 40 and includes an animal contacting trigger means 42 which is of generally angular shape and comprised of a first arm 44 disposed generally upright and a second transversely disposed arm 46, the latter of which projects inwardly toward the center of the animal entry opening. The angular shaped trigger 42 is disposed in generally co-planar relation to the basic plane of the fixed jaw means 20 as well as to the medial plane of movement of the movable jaw 26. Trigger member 42 is pivotally mounted by axial extensions 48 provided at opposite ends of first arm 44 of the trigger, which extensions 48 are pivotally journaled in a pair of apertured bearing brackets 50 and 52 provided respectively on the frame 12 and fixed jaw means 20. It is understood that the second arm constituting the triggering arm 46 extends into the space between the jaws and frame a sufficient distance that the animal cannot enter or pass therethrough without contact with said trigger arm.

Figure 6:
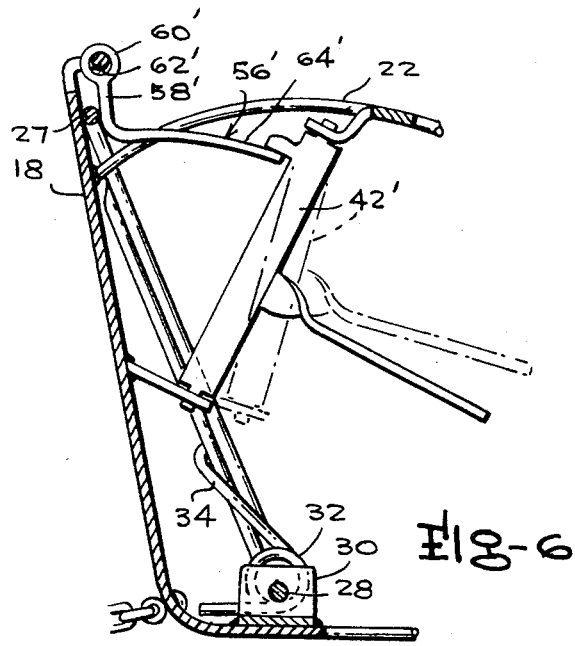
FIG. 6 is a fragmentary front elevational view looking into the animal entry opening, showing a modified form of the trigger and its angular orientation.

The respective bearing brackets 50 and 52 are disposed in such a manner as to effect a preferably inclined mounting of the first arm 44 of the trigger means and oriented generally in one side of the animal entry opening so as not to obstruct same. The second or triggering arm 46 is seen to project in a generally horizontal manner, although slightly angled downwardly as seen in FIGS. 1 and 2, so as to generally pass through the center of the opening. Depending upon the relative height position of bearing bracket 50 upon the upright leg 18 of frame 12, this will help determine the length of first arm 44 as well as the relative angular disposition at which the second or triggering arm 46 is disposed relative thereto. Accordingly some forms of the trigger may be of L-shape as shown in FIGS. 1 and 2 while other forms of the trigger may be of T-shape configuration as seen in FIG. 6. The angular disposition of said first and second arms is generally 90° although they may vary depending upon various modifications of the trap. The arm 46 is preferably disposed to angle downwardly through the center of the tray opening, although it may be disposed more horizontally with a requirement being that it is disposed so as to prevent the animals from passing through the trap without contacting the trigger. The trigger arm 46 is also preferably bent or twisted at 54 closely adjacent its connection with arm 44 so as to present a narrow cross-section and to minimize the obstruction to the opening. In conjunction therewith, it is understood that the complete trigger means 42 conceivably could be formed of circular wire or other rigid material. The angular disposition is also important as contributing to the pendulum like self-centering action afforded by arm 46 to help center the angular trigger member within the medial plane between the fixed arcuate jaw members 22.

Figure 7:
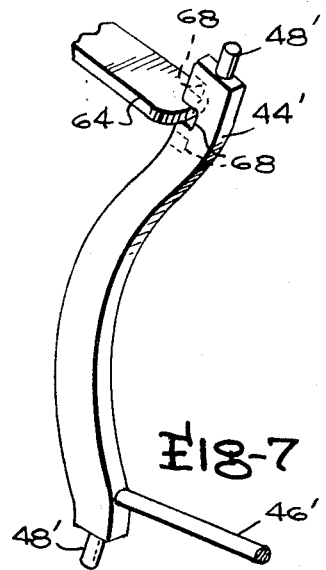
FIG. 7 is a fragmentary perspective view showing a modified detail form of the trigger latch retaining means.

A jaw retaining, pivotally mounted, latch member 56, being of angular formation, is provided with a shorter leg 58 which terminates in a hinge barrel-like sleeve 60 which is loosely pivoted upon horizontal pivot pin 62 mounted upon the upper end of the upright leg 18 of frame 12. The latch further comprises a substantially longer lever type arm 64 terminating in a free end for operative engagement with latch retaining means to be described, and which is formed upon said trigger means. The latch member 56 is used to overlay and retain the movable jaw at its bight portion 27 substantially against the upper portion of the upright frame leg 18. This is achieved by the short leg 58 overlaying said bight portions, and then with the angularly projecting longer arm 64 of the latch member engaging beneath the trigger carried latch retaining means, which in one form is a detent 66 projecting co-planarly from said first arm 44 of the angular trigger but in a direction opposite from that of the triggering arm 46. This is achieved by merely moving the trigger sufficiently to one side (FIG. 5) so that the detent 66 is out of the way of the free end of latch arm 64 as it passes down between the parallel portions of arcuate jaws 22, sufficiently to be engaged beneath said detent arm 66 as the pivoted trigger is moved back into a centered position. While a detent arm of the type 66 may be preferred for most embodiments, it is to be understood that the first arm 44, when made of a straplike material, may be provided with one or more notches 68 shown in FIG. 7. In FIG. 7, the first arm of the angular trigger is designated 44' whereas the second arm is designated 46' and is shown to be of rod-like formation. The first arm 44' in some preferred forms will be of the illustrated arcuate shape to provide a more open entrance way into the trap. In FIG. 7 axial extensions 48' may be better seen which provide a pivotal axis for the trigger assembly.

By providing the latch member 64 with substantial lateral width, better seen in FIG. 5, and by restricting the detent arm 66 to substantially lesser width, it is apparent that a considerably further horizontal travel of the trigger arm 46 is required before detent 66 slips off the top of latch arm 64 to free the latch 56 which is then pivotally swung up from between the parallel guide portions of fixed jaw members 22 by the impetus of the closing movement of jaw 26 responsive to heavy-duty springs 32.

It is apparent that the close proximity of the angular holding leg 58 of the latch 56, as related to the pivot point or axis 62, thereby enables cocking of the spring biased jaw by only a relatively light pressure to hold the considerably much stronger spring action by the self-centering latch and trigger mechanism thereby resulting in requirement of only light triggering pressure by the animal when advancing through the entry opening of the trap.

MODIFICATIONS

Reference to FIG. 6 not only shows a modified T-shaped trigger means, whose angular disposition may be varied as shown in dashed lines, but also shows a slightly modified latch member 56'. In this form, the short leg 58' connects more centrally with the pivot-enabling sleeve 60', rather than tangentially as in the first described embodiment; however, the pivot rod axis or shaft 62' is mounted in slightly greater offset condition relative to upright leg 18 of the frame 12, to thereby provide the requisite holding of the jaw by the short leg 58' in close proximity to the pivot axis. In some forms the longer arm or leg 64' may be slightly curved.

The trap is suitably anchored in its adjacent environment by means of a chain or the like designated 70 which may be attached in any suitable manner to the frame or base bracket 14. The action of the movable jaw being in the direction of the base and underlying ground support provides a more stable operation thereof with a resultant force tending to retain the trap and trapped animal in an upright condition.

The complete construction and operational features of my improved trap are believed to be self-evident from the detailed foregoing description and accompanying drawings, and therefore a further detailed explanation of the operation need not be repeated.

Briefly to facilitate easy setting of the trap, a right-handed person would place the trap in his left hand, holding it by the upright leg 18 above the chain connection, with the latch 56 being in an out-of-the-way position, and in a manner to enable the trigger bar to be moved by the thumb and fingers. Then holding the movable jaw 26 with the right hand, the left hand with trap can be rolled toward the right hand which simultaneously effects compressing of the jaw, while straddling the triggering bar, and against the bias of the springs 32 until it rests against the upright leg 18. At this point the latch 56 is flipped over by the forefinger of the left hand, to overlay the bight portion 27 with the shorter leg 58 of the latch, and with the longer leg or arm 64 passing between the spaced parallel portions of fixed jaws 22. The left hand fingers and thumb either move the trigger bar or hold the trap appropriately so that the latch retaining detent 66 engages the top side of the latch arm 64 in a self-centering manner to thereby set the trap.

From the foregoing detailed descriptions, it is apparent that my novelly improved trap achieves all of the objectives and advantages set forth in the preamble and other portions of the specification. It is also evident that there may be a number of changes and alterations or other modifications of the present invention which those skilled in the art may make without departing from the spirit of the invention. Accordingly reference should be made to the appended claims for a determination of the scope thereof as applied to such variations and alternate modifications which may be considered as falling within the scope of the appended claims.

I claim:

1. An animal trap comprising in combination a base frame having leg portions connected in generally right angular formation as viewed from the entering side of the trap; one of said leg portions normally adapted to stabilize the trap upon a base surface and the other leg portion projecting angularly upward therefrom; said frame having a substantial fore-and-aft dimension in the entering direction to provide good stability for the trap; a spring biased movable jaw and a stationary jaw; said stationary jaw having a large arcuately shaped portion with ends rigidly connected to and near opposite end portions of said base frame to form therewith a generally circular animal entry opening; said movable jaw being movable in a plane transverse to the axis of the animal entry opening, and which plane is generally co-planar to the major plane of said stationary jaw; said movable jaw being formed of an elongated U-shaped member having a bight portion and disposed in an inverted upright relation when in a cocked condition as held adjacent said upwardly projecting leg portions of said base frame; trigger means disposed generally in the plane of said stationary jaw and with means providing self-centering mounting of a trigger member having a triggering arm for fore-and-aft pivotal movement, said triggering arm extending generally through the center portion of said entry opening, said trigger means including a latch member pivotally connected to said frame and overlaying and releasably retaining said movable jaw at its bight portion in said cocked condition and having a free end operatively engaged with said trigger; the trap arrangement being more humane and such that an animal being trapped must move a substantial distance into the trap before triggering same, and said movable jaw being spring moved when released in a direction of the ground-supported base portion thereby precluding a tendancy to overturn the trap.

2. An animal trap as defined in claim 1, wherein said base frame leg portions are disposed in obtuse angular formation.

3. An animal trap as defined in claim 1, weherein said trigger member is of generally angular shape having two transversely disposed arms, a first arm of which is oriented generally in an upright condition and pivotally mounted between and relative to portions of said frame and fixed jaw, but offset to one side of said animal entry opening; the second or other arm of said trigger member constituting the aforesaid triggering arm which extends generally horizontally away from said first arm pivotal mounting and through the center portion of said animal entry opening.

4. An animal trap as defined in claim 3 where said means for effecting said self-centering mounting of said trigger include means for angularly mounting same with said first trigger arm in an inclined offset manner at one side of said entry opening, so that said triggering arm projects angularly downward while passing generally through the center of said animal entry, with the force of gravity helping create the self-centering relationship thereof with said latch member.

5. An animal trap as defined in claim 3 wherein said trigger member is of generally L-shape configuration.

6. An animal trap as defined in claim 3, wherein said trigger member is provided on an upper end portion of its said first arm with unitarily formed latch-holding means to effect said cocked condition of said movable jaw.

7. An animal trap as defined in claim 6, wherein said latch-holding means is a detent unitarily formed with and projecting generally in a co-planar manner from the upper end of said trigger first arm.

8. An animal trap as defined in claim 6, wherein said latch-holding means comprises at least one notch formed in an upper edge of said trigger first arm, and within which notch said free end of said latch member engages.

9. An animal trap as defined in claim 1 wherein said latch member is of angular form with a longer leg constituting said free end thereof, and having a substantially fore-shortened leg a free end of which provides said pivotal mounting of said latch, said latch mounting and angular form being such as to hold said movable jaw in its cocked condition by said shortened leg adjacent its pivotal mounting, thereby facilitating a leverage system requiring only light pressure at said free end of said latch member to contain a much stronger spring biased-jaw in its cocked condition, resulting in triggering initiated by relatively light pressure by the animal during entering said trap.

10. An animal trap comprising in combination an angular frame at least part of which constitutes a base portion to help orient the trap relative to an animal pathway or to an opening of an animal lair; a movable spring-biased first jaw means and stationary second jaw means supported on said frame; said second jaw means including a jaw member having a large arcuate portion forming a major part of a generally circular animal entry opening with said angular frame, which opening has an axis perpendicular to the direction of movement of said movable first jaw means; said arcuate second jaw member fixedly secured at its end sides to generally opposite end portions of said angular frame; said first jaw means including a movable jaw member formed of an elongated inverted U-shaped member having a bight portion and having the free ends of the legs of its U-shape pivotally connected with and at generally opposite fore-and-aft sides of said base portion, said first jaw member disposed so its bight portion encloses and its movable outwardly adjacent and relative to said second jaw member between cocked-open and trigger-closed positions with said bight portion movable toward and away from generally opposite end sides of said second arcuate jaw member, which end sides are disposed oppositely remote from said pivotal connection of said first jaw member; strong, heavy-duty spring means operatively interconnected with said frame and movable jaw to strongly bias said jaw toward its closed animal-trapping position relative to said stationary jaw and said frame; trigger means releasably preventing relative movement between said jaws when in the cocked condition; said trigger means comprising an animal contact trigger member of generally T-shape and disposed with the top bar of the T pivotally mounted between and relative to portions of said frame and fixed jaw and oriented in a generally upright condition, but offset angularly to one side of said animal entry opening and relative to a vertical reference line perpendicular to said base frame; and the transverse leg of said T-shaped member having a free end extending at a corresponding angle relative to a horizontal reference line, with said leg passing generally through the central part of said animal opening of the trap and in a direction away from said pivotal mounting of said trigger top bar and said first jaw; said T-shape trigger being pivotally movable fore-and-aft of said trap opening but within the general upright transverse plane of movement of said U-shape movable jaw member relative to said stationary jaw, and by the angular disposition of said T-shaped trigger it provides a potentially less obstructed trap opening; said trigger means further comprising a two-ended latch member pivotally connected at one end of an upper portion of said angular frame so as to selectively overlay and releasably hold said first movable jaw in its cocked open position; said latch member being of rigid strap-like material and disposed so that its pivotal movement is generally co-planar with the major medial plane of said stationary arcuate jaw, and said other end of said latch operatively and releasably engagable with overlaying latch-holding means provided unitarily upon and movable with an upper end portion of said T-shape trigger to selectively effect said cocking of said movable jaw; said latch-holding means being of a lesser width dimension than said strap-like latch member such that said overlaying latch-holding means is permitted both a substantial pivotal movement with said trigger and also overlying sliding contact with said latch member before releasing said latch and cocked jaw, whereby said trigger and latch-retaining means are so proportioned that an entering animal to be caught thereby must move said trigger substantially away from the entry and be a substantial distance into the trap before said movable jaw snaps shut.

11. A trap as defined in claim 10, wherein said latch-holding means is a detent unitarily formed with and projecting generally in a co-planar manner from the upper end of said T-shaped trigger.

12. A trap as defined in claim 10 wherein said latch-holding means comprises at least one notch formed in an upper edge of said T-shape trigger within which notch said free end of said latch engages.

13. A trap as defined in claim 10 wherein said trap jaws, and at least a portion of said frame are fabricated of a rigid heavy duty wire material and being formed to have a substantial fore-and-aft dimension to provide good stability for the trap.

14. A trap as defined in claim 10, wherein said latch member comprising part of said trigger means is of angular formation having a longer leg at the free end portion thereof and having a substantially fore-shortened leg near the axis of the pivotally mounted end, such that the upper part of said movable jaw is held in its cocked condition by said shortened leg at a point closely adjacent to the pivotal mounting of said latch to the frame, thereby facilitating a leverage system requiring only light pressure at said free end of said latch member to contain a much stronger spring biased-jaw in its cocked condition, resulting in triggering initiated by relatively light pressure by the animal during entering said trap.

15. A trap as defined in claim 10, wherein said frame and stationary jaw are provided with opposed pivot-facilitating bearing means, said T-shaped trigger top bar is provided with co-planar oppositely directed axle portions at opposite ends thereof to facilitate the pivotal journaling thereof in said bearing means, and said angular disposition of said T-shape triggering being such that said leg projects angularly downward while passing substantially through the center of said animal entry, and in a manner as to create a self-centering relationship of said latch retaining means of the upper end portion of said trigger with said latch member.

16. A trap as defined in claim 10 wherein said angular base includes one leg portion adapted to rest essentially upon a ground or similar support, and having an obtusely upwardly angled other leg portion connected therewith; said fixed jaw having at least one end portion which is bifurcated and which constitutes an upper portion which is connected to and near an upper end portion of said frame's upwardly angled leg portion; said latch-holding means on said T-shape trigger member projecting toward the pivotal mounting of said latch member; and said free end of the said latch member during cocking of said movable jaw, projecting freely into said bifurcated upper end portion of said stationary jaw, and which free end of said latch member engageably underlies said latch-holding means on said trigger.

* * * * *

UNITED STATES PATENT OFFICE
CERTIFICATE OF CORRECTION

Patent No. 3,757,457          Dated September 11, 1973

Inventor(s) Andrew M. Martin

It is certified that error appears in the above-identified patent and that said Letters Patent are hereby corrected as shown below:

Column 4, line 45, "tray" should be --trap--.

Column 8, lines 35, 36 "T-shaped member" should read --T-shaped trigger member--.

Claim 12, line 4, "free end" should read --other end--.

Claim 14, lines 3 and 10, "free end" should read --other end--.

Claim 15, line 11, "latch retaining" should read --latch-holding--.

Claim 16, line 5, "fixed" should read --stationary--; lines 11 and 14, "free end" should read --other end--.

Signed and sealed this 17th day of September 1974.

(SEAL)
Attest:

McCOY M. GIBSON JR.          C. MARSHALL DANN
Attesting Officer             Commissioner of Patents